UNITED STATES PATENT OFFICE.

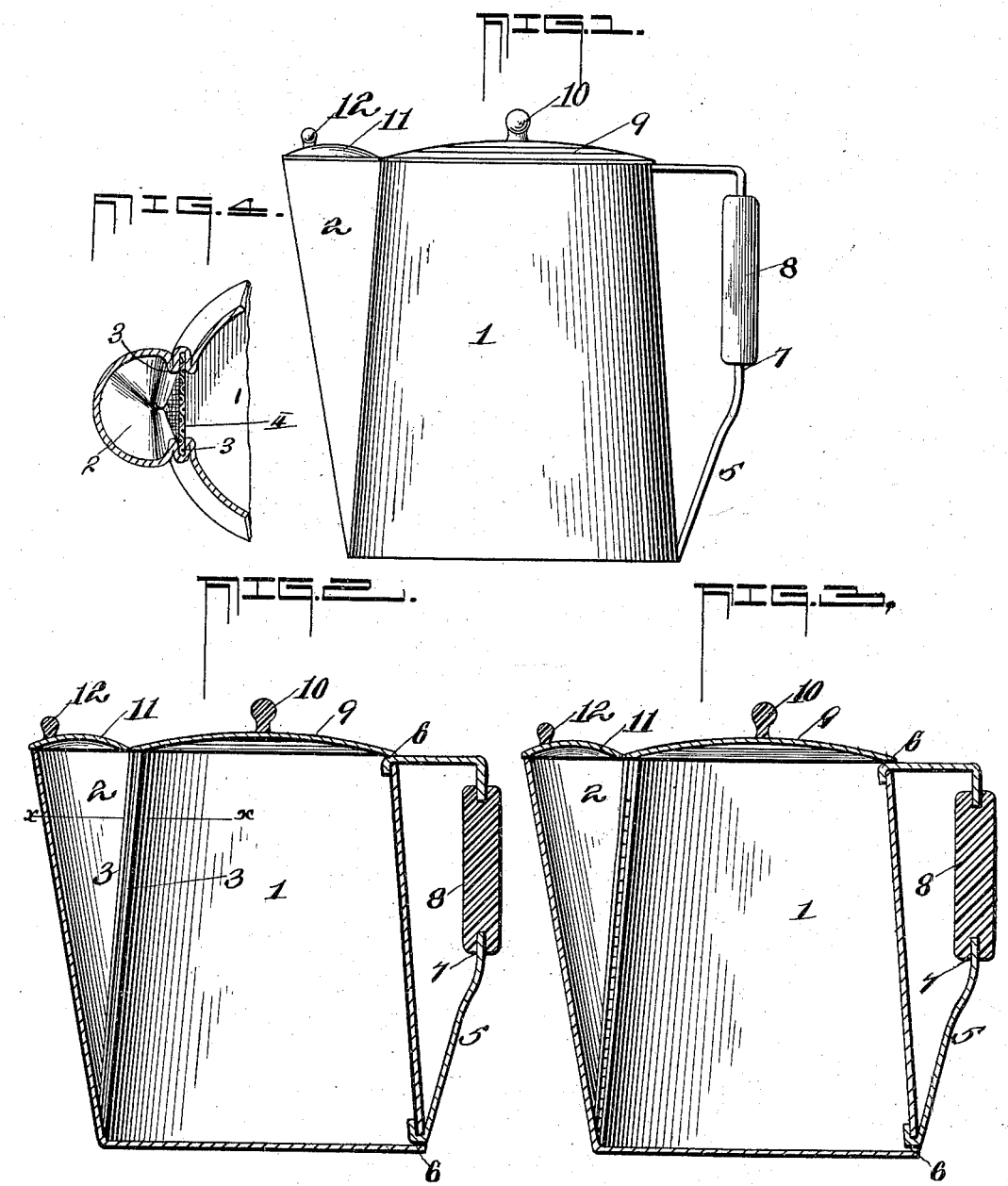

EMMA M. McDOUGALL, OF KANSAS CITY, MISSOURI.

TEA OR COFFEE POT.

SPECIFICATION forming part of Letters Patent No. 612,750, dated October 18, 1898.

Application filed September 11, 1897. Serial No. 651,318. (No model.)

*To all whom it may concern:*

Be it known that I, EMMA M. McDOUGALL, a citizen of the United States, residing at Kansas City, in the county of Jackson and State of Missouri, have invented certain new and useful Improvements in Tea or Coffee Pots; and I do hereby declare the following to be a full, clear, and exact description of the invention, such as will enable others skilled in the art to which it appertains to make and use the same.

My present invention has relation to an improved coffee or tea pot or other similar receptacle, my object being to construct a receptacle of this character in a manner to preclude the possibility of the separation of the parts of which the pot is composed by the melting of the solder usually employed to connect the spout to the receptacle; and to this end the invention consists in forming the spout integral with the receptacle proper.

Referring to the drawings, Figure 1 is a side elevation of my device complete. Fig. 2 is a central vertical section with the strainer removed, and Fig. 3 is a similar view with the strainer in place. Fig. 4 is a sectional detail on line $x$ $x$ of Fig. 2.

Referring to the numerals on the drawings, 1 indicates the top or receptacle proper, which is usually of cylindrical form, and from the usual metal composing which is stamped a spout 2, projecting a considerable distance from the pot at its top and diminishing downwardly to the lower edge of the same.

3 indicates vertically-extending grooves, formed by shaping the metal along the line of juncture between the rear edges of the spout and the body of the receptacle, designed for the reception of a screen or strainer 4, consisting, essentially, of a preferably metallic frame, within which is secured wire-netting, as illustrated.

5 indicates the handle of the pot, formed from a single strand of wire, having its opposite extremities passed into the pot at its top and bottom upon the side opposite the spout and soldered upon the inside, as indicated at 6. The handle may be bent into any desired form, preferably as illustrated, and the vertical portion 7 is provided with a cork or other suitable non-conductive sheathing or grasp 8.

9 indicates the usual cover, and 10 a knob carried thereby and composed of a similar non-conductive material. The spout 2 may or may not be provided with a cover 11, provided like the cover 9 with a non-conductive knob 12. It will be seen that by forming the spout integral with the receptacle the necessity for the use of solder is eliminated, and the spout cannot become detached, as is often the case where devices of this character are heated upon gasolene or similar stoves.

Having thus described my invention, what I claim as new, and desire to secure by Letters Patent, is—

A coffee-pot having walls tapering from bottom to top, a spout tapering from top to bottom, and grooves between the vessel and the spout, adapted to receive a strainer, the entire article being formed of a single sheet of metal by bending and folding, substantially as described.

In testimony whereof I have signed this specification in the presence of two subscribing witnesses.

EMMA M. McDOUGALL.

Witnesses:
   O. J. FRELIGH,
   ALBERT BAIRD.